(12) United States Patent
Wagner et al.

(10) Patent No.: US 8,490,551 B1
(45) Date of Patent: Jul. 23, 2013

(54) PORTABLE CONVERTIBLE ICE COOLED SERVING TABLE

(76) Inventors: Jeffrey A. Wagner, Pottstown, PA (US); Evamay Wagner, Pottstown, PA (US)

(*) Notice: Subject to any disclaimer, the term of this patent is extended or adjusted under 35 U.S.C. 154(b) by 322 days.

(21) Appl. No.: 13/065,866

(22) Filed: Mar. 31, 2011

Related U.S. Application Data

(60) Provisional application No. 61/352,134, filed on Jun. 7, 2010.

(51) Int. Cl.
*A47B 85/00* (2006.01)

(52) U.S. Cl.
USPC ............ 108/25; 312/140.2; 312/229; 108/24

(58) Field of Classification Search
USPC .................. 206/541, 542, 562; 220/629, 636, 220/628, 4.22, 4.21, 833–835, 212, 23.88, 220/23.89, 23.87; 62/371, 457.2, 459, 258, 62/261; 108/33–36, 38, 41, 25, 26, 24, 14, 108/18, 167, 168, 170–173, 175; 312/140.1–140.4, 229, 327, 328, 116, 126, 312/137; 190/12 A, 11
See application file for complete search history.

(56) References Cited

U.S. PATENT DOCUMENTS

| | | | | |
|---|---|---|---|---|
| 2,047,461 A * | 7/1936 | Doyle | | 160/232 |
| 2,406,237 A * | 8/1946 | Milkoff | | 190/11 |
| 2,869,769 A * | 1/1959 | Robinson | | 217/12 R |
| 3,285,464 A * | 11/1966 | Boydman | | 220/837 |
| 3,364,882 A | 1/1968 | Merrick | | |
| 4,037,549 A * | 7/1977 | Hanyu et al. | | 112/258 |
| 4,375,758 A * | 3/1983 | Simmons | | 62/457.1 |
| 4,581,902 A | 4/1986 | Starck et al. | | 62/258 |
| 4,934,549 A * | 6/1990 | Allen | | 220/4.24 |
| 5,025,639 A | 6/1991 | Thomas | | 62/258 |
| 5,060,580 A * | 10/1991 | Shaw | | 108/25 |
| 5,727,857 A * | 3/1998 | Smith | | 312/114 |
| 6,116,456 A * | 9/2000 | Davis | | 220/636 |
| 6,267,111 B1 * | 7/2001 | Burton | | 126/268 |
| 7,779,762 B2 * | 8/2010 | Sackman | | 108/25 |
| 7,997,438 B2 * | 8/2011 | Kelly | | 220/533 |
| 2009/0056595 A1 * | 3/2009 | Dean et al. | | 108/24 |

* cited by examiner

*Primary Examiner* — Janet M Wilkens
(74) *Attorney, Agent, or Firm* — Michael F. Petock, Esq.; Douglas J. Petock; Petock & Petock, LLC

(57) ABSTRACT

A portable convertible ice cooled serving table comprised of two sections is foldable for carrying by a handle. The legs may be folded against the sections. Transparent covers to protect the food from insects and to keep atmospheric heat away from the food and cooling medium are removeably pivotally mountable to the sections when erected and are storable within the folded table, including handles thereon, for transport and storage. The two sections are pivotally openable to form a table and conveniently secured in table position wherein the bases of the two sections are in the same plane. The legs are also provided with easily insertable and releasable braces which are pivotally mounted to the bases of the sections. The sections may be preferably made of insulative material.

6 Claims, 4 Drawing Sheets

PORTABLE CONVERTIBLE ICE COOLED SERVING TABLE

CROSS REFERENCE TO RELATED APPLICATION

This application claims the benefit of provisional application No. 61/352,134 filed Jun. 7, 2010 by applicants herein and entitled Wagner Portable.

FIELD OF THE INVENTION

The present invention relates to a portable convertible ice cooler serving table. More particularly, the present invention relates to a portable convertible ice cooled serving table which may be compactly closed and folded for easy transport by means of a handle and easily opened and extended for serving ice cooled consumables under a transparent pivotally openable cover.

BACKGROUND OF THE INVENTION

During warmer weather, people often like to have outdoor picnics or other outdoor events at which consumables in the form of food and drinks may be served. It is often desirable to provide these with some form of cooling for the cooling of drinks and food, and sometimes it is necessary to keep the food items cold such as in the case of potato salad and the like.

Usually the only way of keeping the items cold and serving them is to keep them in an ice chest which may be used to bring the consumables to the picnic or outdoor event. This is often unsatisfactory since the cooler chest may have to be placed on the ground where people may have to bend over to try to retrieve something to eat or drink or if a picnic table or the like is available, the chest or cooler is placed on the picnic table taking up limited and valuable space which would otherwise be used as an eating table. In either event, the consumables are not visibly displayed until the cooler chest is opened, allowing heat into the cooler chest and more rapid melting of the ice.

SUMMARY OF THE INVENTION

An advantage of the present invention is that it provides a portable and easily transportable serving table to the desired location of serving.

Another advantage of the present invention is that the serving table may be easily and quickly closed and collapsed for transport.

Another advantage of the present invention is that the serving table of the present invention may be easily opened and erected at the desired site of serving.

Another advantage of the present invention is that substantially transparent covers may be provided to keep flies and other insects off of the food, retain the consumables in a cooler condition, reduce melting of the ice all while allowing the consumables to be viewed by people being served without opening the lid.

Another advantage of the present invention is that the lid may be easily pivotally attached and removed allowing the lid to be pivotally opened and closed.

Another advantage of the present invention is that the transparent cover may be provided with a handle and still stored within the portable serving table.

Another advantage of the present invention is that the serving table may be comprised at least in part of insulative material enabling the consumables to be maintained in a cool condition and extending the life of the ice used to keep the consumables cool.

Briefly and basically, in accordance with the present invention, an apparatus is provided which includes a first and a second section, each of the sections has a base and a plurality of sidewall portions defining a first and a second receptacle, respectively. The first and second sections are of the same shape and size. Means is provided for pivotally joining the first and second sections. The means for pivotally joining the two sections enables the first and second sections to move between a closed position, wherein one of the sidewalls of the first and second sections are juxtaposed, and to an open position where the bases are in a single plane. Means for securing the juxtaposed sidewalls is provided to maintain the basis of the first and second sections in the same plane. Transparent covers are provided for each section with means for removeably pivotally mounting the transparent covers to the sidewall of the sections. A drain is provided in the base of each section for the drainage of water from melting ice and to provide a nesting space for the handle of the transparent cover when the transparent cover is inverted and stored in the receptacle of the section for transport. The apparatus is provided with folding legs pivotally attached to an outer portion of each section. The legs are lockable in a folded position and lockable in an extended position to support the sections. Latches are provided to hold the sections in a closed position for transport of the apparatus and at least one of the sections is provided with a handle for carrying the sections.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

DETAILED DESCRIPTION OF THE PREFERRED EMBODIMENTS

Figure 1:
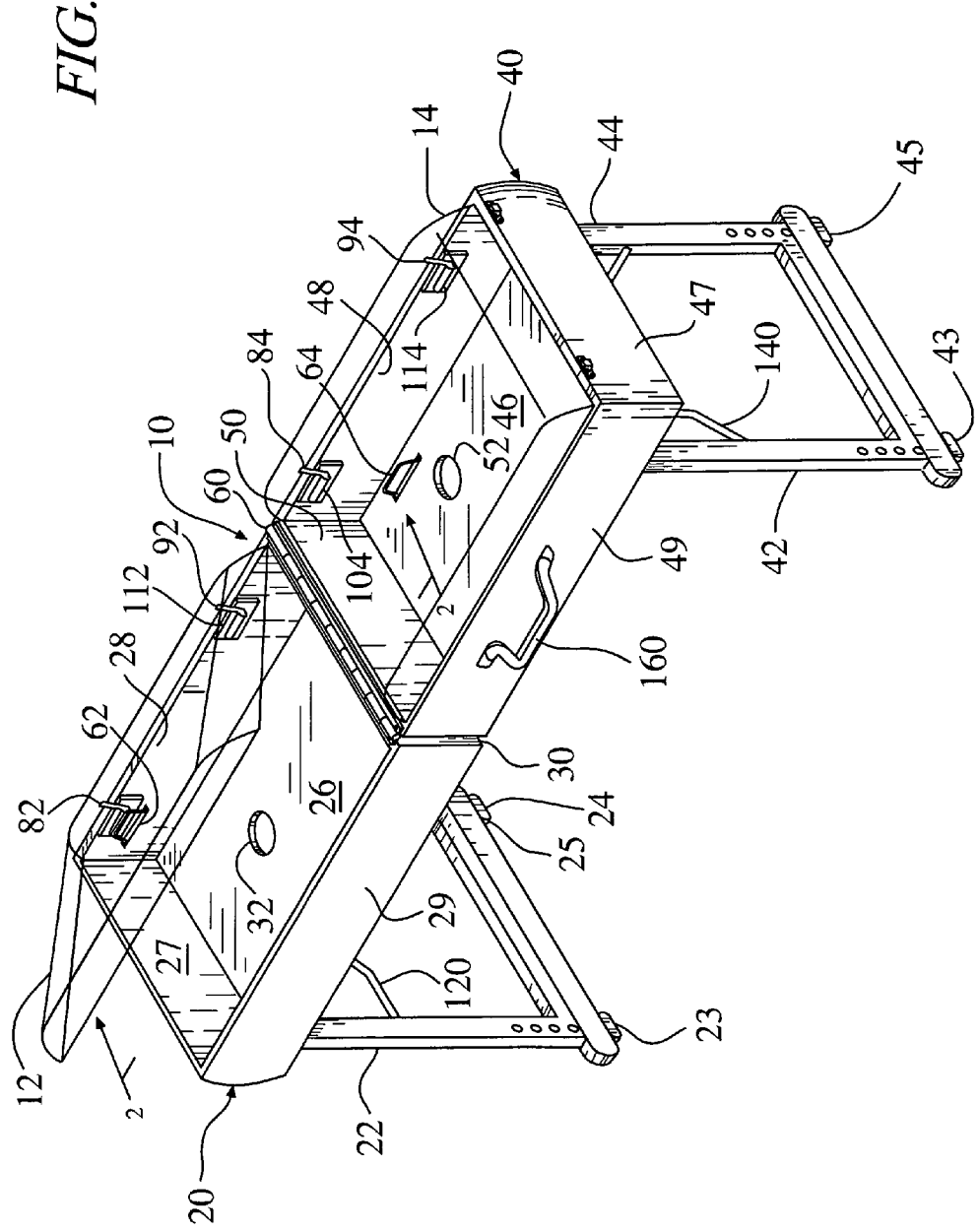
FIG. 1 is a view in perspective of a portable convertible ice cooled serving table in accordance with the present invention in its erected form.

Referring now to the drawings, wherein like numerals indicate like elements, there is shown in FIG. 1 a portable convertible serving table 10 which may be ice cooled in accordance with the present invention. Portable convertible serving table 10 is shown in FIG. 1 in its erected form with transparent covers 12 and 14 by removeably pivotally attached to sections 20 and 40, respectively. The serving table is supported by legs 22, 24, 42 and 44.

Referring now to FIGS. 1 through 4, it may be seen that the portable convertible serving table 10 is comprised of a first section 20 and a second section 40 with each section having a base, 26, 46 and a plurality of sidewall portions, namely 27, 28, 29 and 30 on section 20 and 47, 48, 49 and 50 on section 40. Base 26 and sidewall portions 27 through 30 form a first respectable of section 20. Base 46 and sidewall portions 47 through 50 form a second respectable of section 40. First section 20 and second section 40 are of the same shape and size. Base 26 is provided with a drain opening 32 which will be described hereinafter as performing the functions not only of a drain for melting water ice but also as an opening for handle 62 of transparent cover 12. Second section 40 is provided with a drain opening 52 which functions as a drain for melting ice when the table is erected and as an opening for receipt of handle 64 of transparent cover 14 when the portable convertible serving table 10 is folded for transport or storage.

Figure 4:
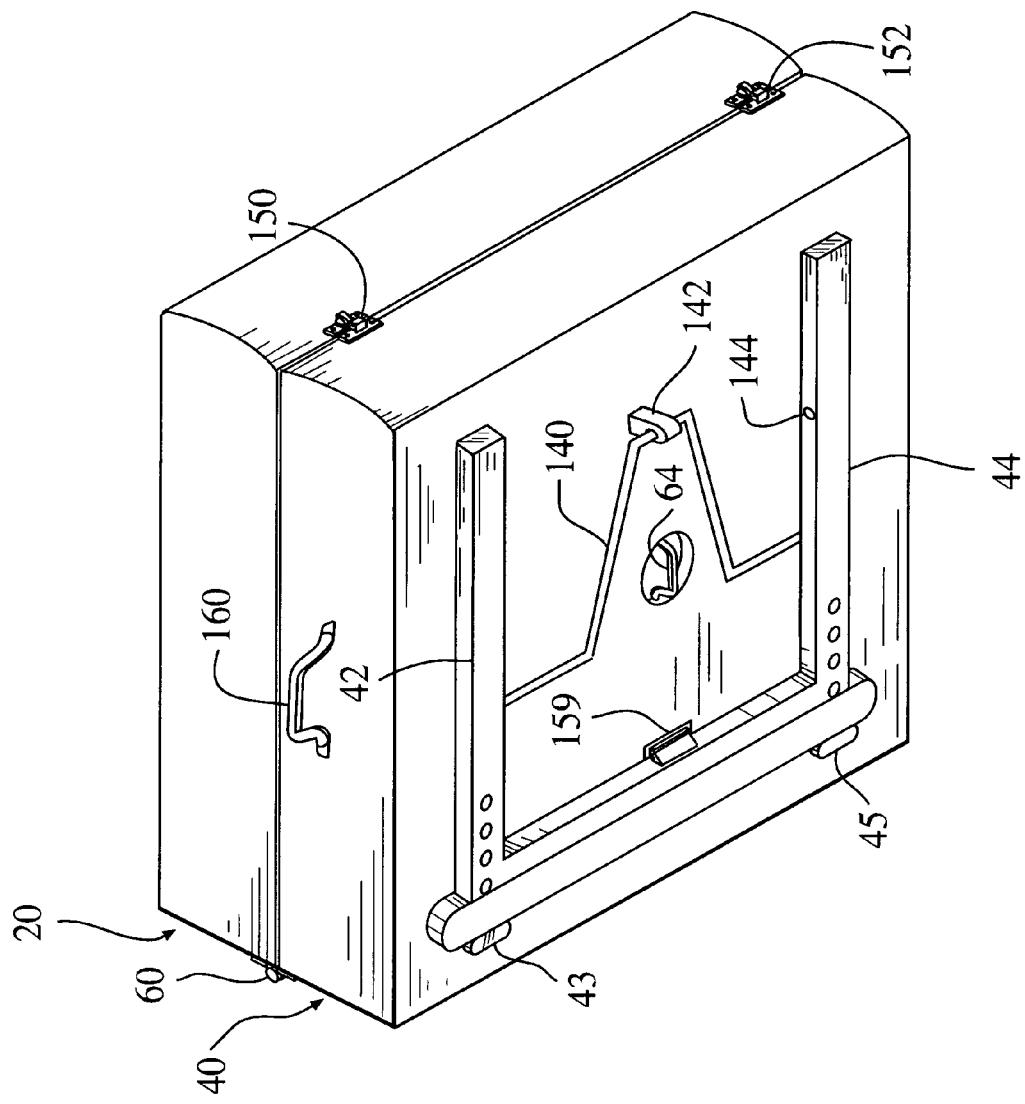
FIG. 4 is a view in perspective of the portable convertible ice cooled serving table of the present invention in its collapsed form with its legs folded.

First and second sections, 20, 40 are connected together by a hinge 60 which in a presently preferred embodiment may be an elongated hinge sometimes referred to as a piano hinge. Piano hinge 60 is a means for pivotally joining the first section with the second section and provides means for pivotally joining which enables first section 20 and second section 40 to move between a closed position wherein an outer edge of the sidewalls of first section 20 are juxtaposed with the outer edge of the sidewall of the second section 40 as best shown in FIGS. 1 and 4. Piano hinge 60 also allows pivotal movement to an open position as shown in FIG. 1 wherein bases 26 and 46 are in a single plane, or at least a portion of the bases 26 and 46 are in a single plane where, for example, bases 26 and 46 are not planar throughout their area.

Figure 2:
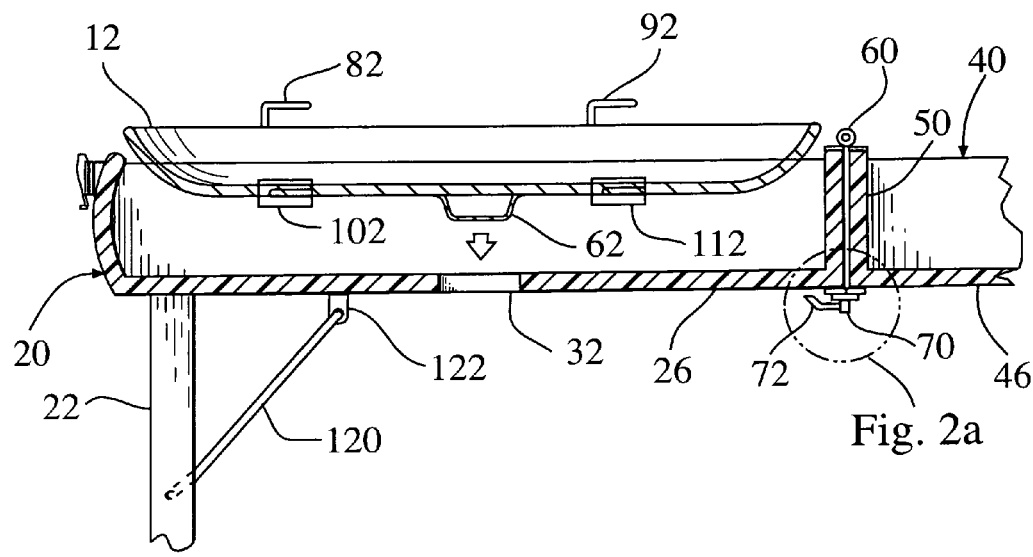
FIG. 2 is a partially broken away cross-sectional view taken along line 2-2 of FIG. 1.
Figure 2A:
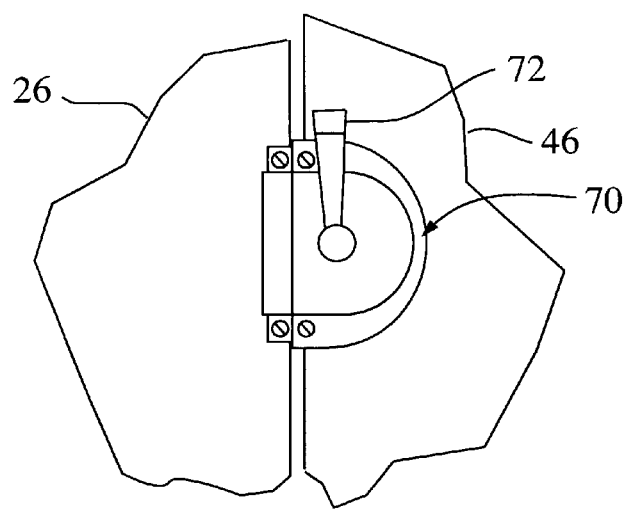

FIG. 2 is a cross-sectional view of a broken away portion of FIG. 1 taken along line 2-2 of FIG. 1 with transparent cover 12 removed from its pivotal attachment to section 20, inverted and placed into section 20 for storage. It is noted that handle 62 of transparent cover 12 will be seated or placed into drain opening 32. Further, FIG. 2 shows means for securing 70 of the sidewall 30 in juxtaposed relationship with one of the sidewalls of section 40, namely sidewall 50. Piano hinge 60 is mounted at the outer edge of sidewalls 30 and 50. Sidewalls 30 and 50 are secured by securing means 70 in the form of a latch. The means for securing 70 of the sidewalls 30, 50 of the first and second sections in juxtaposed relationship causes the bases or at least a portion of the bases of first section 20 and second section 40 to be in the same plane. Securing means 70 is preferably in the form of a latch or lock which tightens as lever 72 is forced to the closed position. Securing means 70 is shown in greater detail in the upwardly looking partially broken away view of FIG. 2A. As may be best seen in FIG. 2, when securing means 70 is secured, this causes an outer surface of sidewalls 30 and 50 to be in juxtaposed relationship with each other and causes the base 26 of section 20 to be in the same plane as the base 46 of section 40. It is noted that sidewall portions 27, 29, 47 and 49 need not be linear, but may be any suitable shape including rounded or curved. Sections 20 and 40 may be comprised of any suitable material, including plastic, foamed plastic with a skin covering as is commonly used in coolers, wood, or any other suitable fairly rigid material. Sections 20 and 40 are preferably made of an insulative material.

Figure 3:
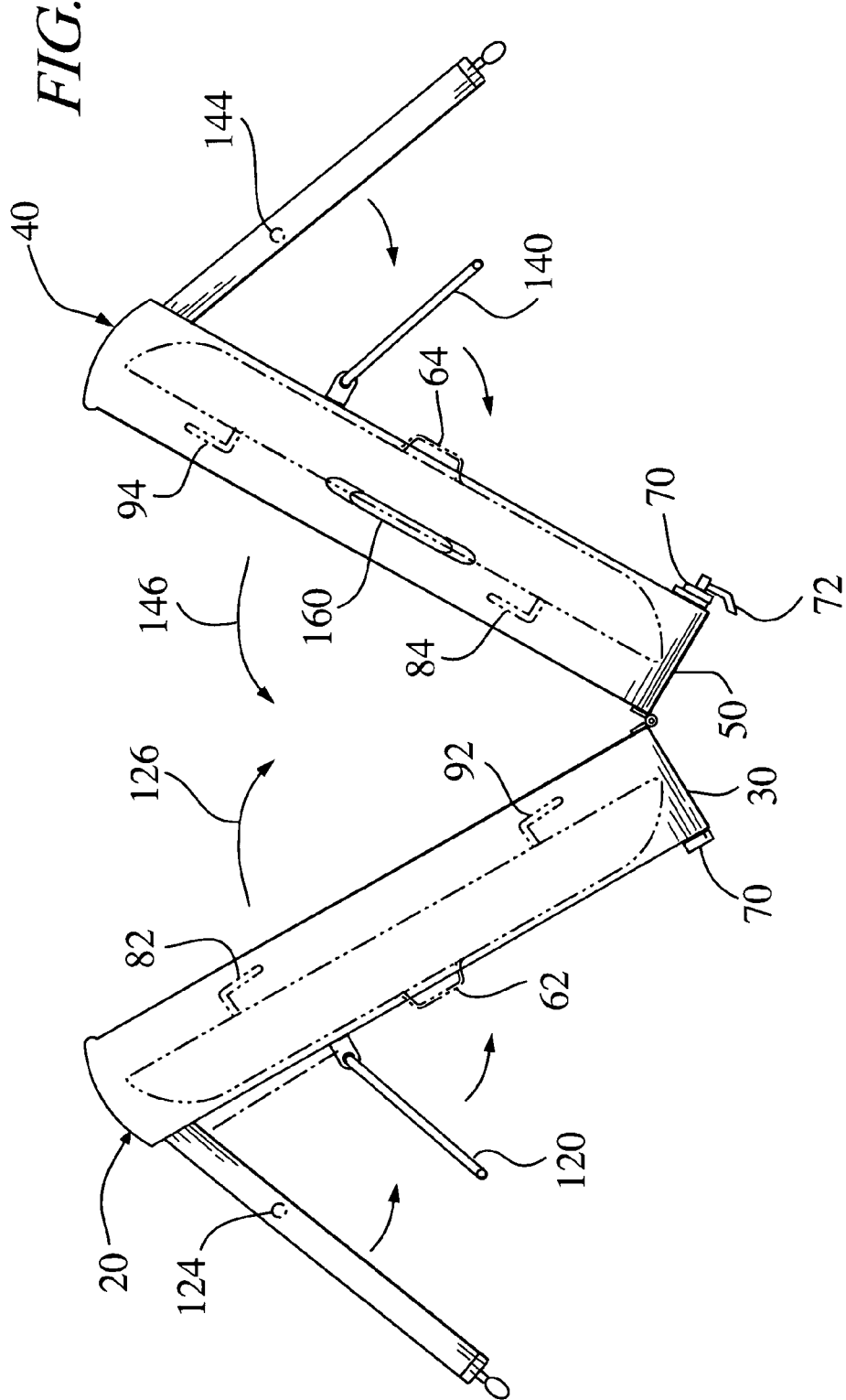
FIG. 3 is an elevation view of the embodiment of FIG. 1 of the present invention in the process of being collapsed.

As may be best seen in FIGS. 2 and 3, transparent covers 12 and 14 are provided with means for removably pivotally mounting the substantially transparent covers 12, 14 to a sidewall portion 28, 48 for selectively pivotally covering and exposing the receptacles. In a presently preferred embodiment, transparent cover 12 may be provided with "L" shaped pins 82, 92 which may be slidably inserted into tubes 102, 112 mounted to sidewall 28 in section 20. In a similar manner, L-shaped pivot pins 84, 94 are provided on substantially transparent cover 14. L shaped pins 84 and 94 may be slidably mounted within tubular structures 104, 114 on sidewall 48 of section 40. As may be best seen in FIG. 1, substantially transparent covers 12, 14, may be closed as shown with respect to substantially transparent cover 14 and may be opened as shown with respect to substantially transparent cover 12 in which the front end is being lifted as the cover pivots on the removable pivots structure comprised of pins 82, 92 pivoting in tubular structures 102 and 112.

Portable convertible serving table 10 is supported on legs 22, 24, 42 and 44 as described above. Legs 22, 24, 42 and 45 may be made of any suitable rigid material, including wood, plastic, metal or any other suitable material. These legs are foldable along the bottom surface of the bases 26, 46. The legs are held in position by braces which secure them in the vertical or erect position or allow them to pivot to a retracted position along the outer surface of the bases 26, 46.

Continuing to refer to FIGS. 1 through 4, legs 22, 24 of section 20 are secured in position by brace 120. In a similar manner, legs 42 and 44 of section 40 are secured by a brace 140. Braces 120 and 140 may be preferably constructed of a resilient material, such as spring steel. Braces 120, 140 are pivotally mounted at their upper ends to the under surface of bases 26, 46, respectively. Particularly referring to FIG. 2, there is shown a pivotal mount 122 for brace 120 and in FIG. 4 there is shown a pivotal mount 142 for brace 140. The resilient ends of the braces may be flexed towards each other to allow them to be inserted into a hole in the legs. For example, the free ends of brace 120 shown in FIG. 3 may be inserted into holes 124. The free end of brace 140 may be inserted into holes 144. To lower the legs, the two ends of the brace are forced slightly towards each other to allow them to be released from the holes in the legs and the table may be folded as illustrated in FIG. 3 wherein sections 20 and 40 are allowed to come together in the direction of arrows 126 and 146 once securing means 70 is released. The leg braces 120 and 140 are compressed together slightly to allow them to be removed from their respective holes 124 and 144 in the legs. The serving table may continue to be folded until it achieves the form shown in FIG. 4 wherein the edges of the sidewalls of the two sections 20, 40 are juxtaposed and held together by means of latches 150, 152. The legs are secured to the outer surface of the bases by a resilient clip 154. The ends of the braces may be placed behind the legs, that is between the legs and the outer surface of the base and held in that position for transport, as best illustrated in FIG. 4. The portable convertible serving table 10 is provided with at least one handle 160 on one of the sections. As illustrated in the drawings, handle 160 is provided on section 40 for ease of transport.

The legs may be provided with threadable height adjustments in the form of threadable height adjustable feet 23, 25, 43 and 45.

In use, the portable convertible serving table 10 may be carried by handle 160 or otherwise transported to a desired location of a party, picnic or other event which requires the serving of consumable food items. Usually, these consumable food items need to be kept cold, and preferably, would be kept cold by the use of ice, either ice made from water or carbon dioxide, sometimes referred to as dry ice. In any event, the portable convertible serving table 10 may be transported to the desired location. At the desired location, latches 150, 152 may be released and the portable convertible serving table opened in the reverse of that shown by the arrows in FIG. 3. It is understood that two latches 150 and 152 are not needed, and that this may be accomplished by a single latch positioned in the center or otherwise along the edge. In erection, the legs are pivotally secured in position by insertion of the brace ends into the holes provided for them in the legs, namely holes 124 and 144. The outer surfaces of sidewalls 30 and 50 are brought in juxtaposition relationship and secured in that position by securing means 70. It is understood that one or more securing means 70 may be utilized.

The substantially transparent covers 12 and 14 are removed from the receptacles of section 20 and 40, are inverted and mounted to the sidewalls. Substantially transparent cover 12 is pivotally mounted by means of sliding pins 82, 92 into the tubular mounts 102 and 112 on sidewall 28. In a similar manner, the substantially transparent cover 14 is mounted over the receptacle formed by the base and sidewalls of section 40.

Preferably, the structure of the base and sidewalls of sections 20 and 40 is made of an insulative material which enables the consumable food items to be more easily kept cold and extends the life of the ice or other cooling medium which may be utilized for cooling purposes. If ice made from water is utilized for cooling, the drains 32 and 52 function to allow release of water resulting from the melting ice. An important advantage of the present invention is that the food consumables are easily visible through the transparent covers and yet the food consumables are covered preventing insects and the like from landing thereon and helping to maintain the food cool by providing a barrier between the ice and chilled food on the one hand and the atmosphere on the other hand.

The present invention may be embodied in other specific forms without departing from the spirit or essential attributes thereof and, accordingly, reference should be made to the appended claims, rather than to the foregoing specification as indicating the scope of the invention.

We claim:

1. Apparatus, comprising;
    a first and a second section, each said section having a base and a plurality of sidewall portions defining a respective first and second receptacle, said first and second sections being of the same shape and size;
    means for pivotally joining said first section with said second section, said means for pivotally joining enabling said first and second sections to move between a closed position, wherein an outer edge of said sidewalls of said first and second sections are juxtaposed, and an open position where said bases are in a single plane;
    means for securing one of said sidewalls of said first and second sections in juxtaposed relationship with said bases of said first and second sections being in the same plane;
    a first substantially transparent cover;
    means for removeably pivotally mounting said first substantially transparent cover to one of the sidewall portions of said first receptacle for selectively pivotally covering and exposing said first receptacle;
    a second substantially transparent cover;
    means for removeably pivotally mounting said second substantially transparent cover to one of the sidewall portions of said second receptacle for selectively pivotally covering and exposing said second receptacle;
    a drain opening in the base of each said section;
    a handle on each said substantially transparent cover, said handle being stored in said respective drain opening when said respective transparent cover is inverted and placed in said respective receptacle;
    folding legs pivotally attached to an outer portion of each said section and being lockable in a folded position and lockable in an extended position to support said sections;
    latch means to hold said sections in a closed position for transport;
    at least one of said first and second sections being provided with a handle for carrying said sections; and
    wherein said first and second sections may be placed in said closed position and carried by said section handle for carrying said sections and wherein said sections may be placed in the open position, secured by said securing means, said legs extended and said transparent covers pivotally attached to said receptacles with ice and consumables contained within the receptacles.

2. Apparatus in accordance with claim 1 wherein said first and second sections and said bases are rectangular in shape.

3. Apparatus in accordance with claim 1 wherein said bases and said plurality of sidewall portions are made of an insulative material.

4. Apparatus in accordance with claim 1 wherein said means for pivotally joining said first and second sections is a hinge mounted on an upper edge of adjacent said sidewalls of said first and second sections and wherein said means for securing said ones of said sidewalls of said first and second sections in juxtaposed relationship is comprised of structure for holding the base end of said sidewalls together.

5. Apparatus, comprising:
    a first serving table section, said first serving table section having a base and a sidewall connected to a periphery of said base and extending outwardly from said base and substantially perpendicular to said base, said sidewall having a first flat portion, said first serving table section being constructed of insulative material;
    a second serving table section, said second serving table section having a base and a sidewall connected to a periphery of said base and extending outwardly from said base and substantially perpendicular to said base, said sidewall having a first flat portion, said second serving table section being constructed of an insulative material;
    said first and second serving table sections being connected together by a hinge mounted to said first flat portion of the sidewall of said first and second serving table sections at an outward edge of said sidewalls enabling said first and second serving table sections to close together with the outer edges of the sidewalls mating and to open said sections such that the bases of said first and second serving table sections lie in a single plane;
    securing means for securing an outer surface of said first flat portion of the sidewall of said first and second serving table sections in juxtaposition when said first and second serving table sections are opened such that the bases of said sections are in alignment for use as a serving table;
    latch means on a second portion of the sidewall of said first and second serving table sections opposite said hinge;
    a handle on an exterior surface of the sidewall of at least one of said first and second serving table sections;
    a folding leg means on the exterior surface of said base of each of said first and second serving table sections, said leg means being lockable in a folded and an extended position;
    said base of each of said first and second serving table sections being provided with a centrally disposed drain opening;
    each of said first and second serving table sections being provided with a transparent cover with a handle positioned to correspond with the position of the drain opening in the base, said handle being storable in the drain opening of the base when the transparent cover is inverted;
    whereby said first and second serving table sections may be hingeably pivoted to close when said transparent covers are inverted with their handles in the drain openings and be retained closed by said latch means and carried by said handle; and wherein the apparatus may be utilized as a serving table when said latch means is released and said first and second serving table sections are pivotally opened such that at least a portion of the bases of both sections are in a single plane and so by said securing means, the leg means being unfolded away from the base and locked to support said serving table sections, and said transparent covers being removed from said first and second serving table sections and placed on said sections with handles in an upward direction.

6. Apparatus in accordance with claim 5, including means for removeably pivotally attaching at least one of said transparent covers to one of said first and second serving table sections.

\* \* \* \* \*